March 16, 1926.  
J. A. BELL  
1,576,499  
CONVERTIBLE TRACTOR TRUCK DEVICE  
Filed March 31, 1924  3 Sheets-Sheet 1
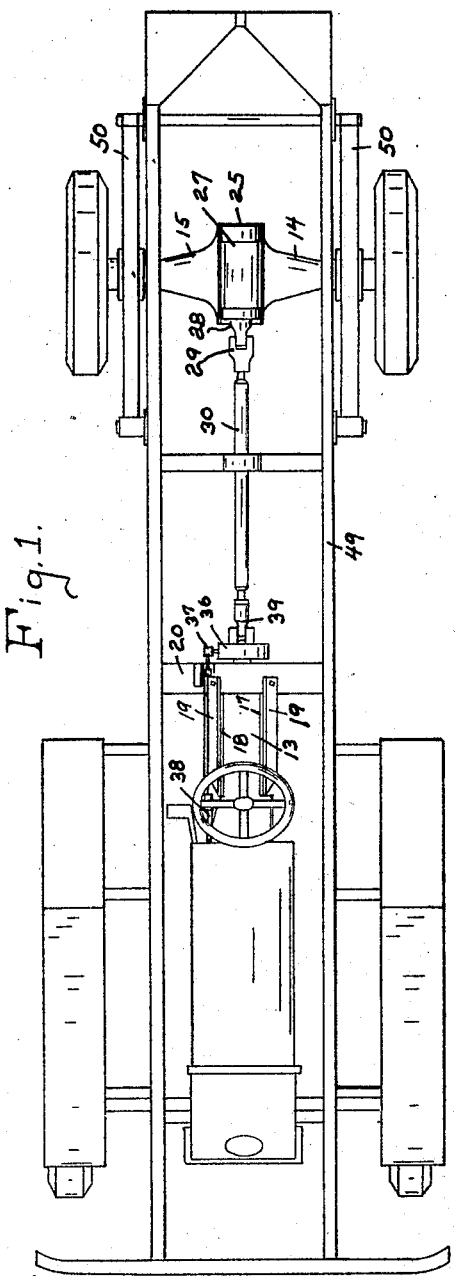
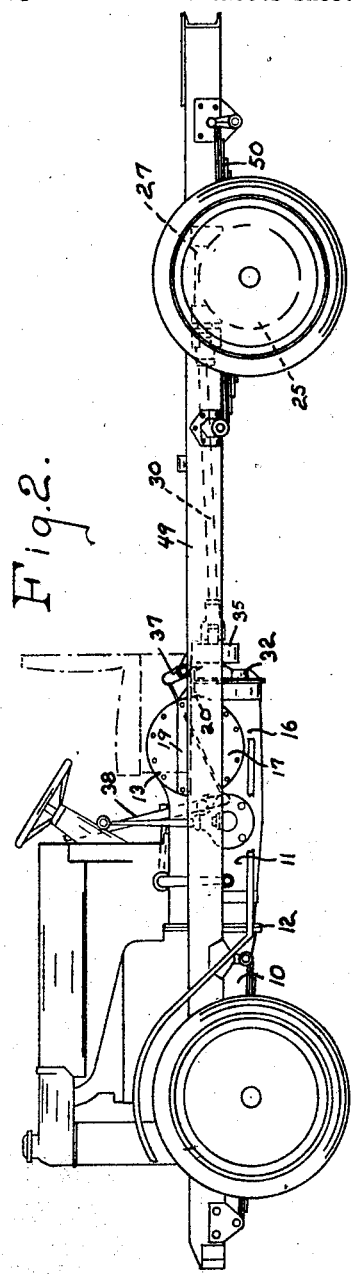
INVENTOR.  
James A. Bell  
BY  
Erwin, Wheeler & Woolard  
ATTORNEYS.

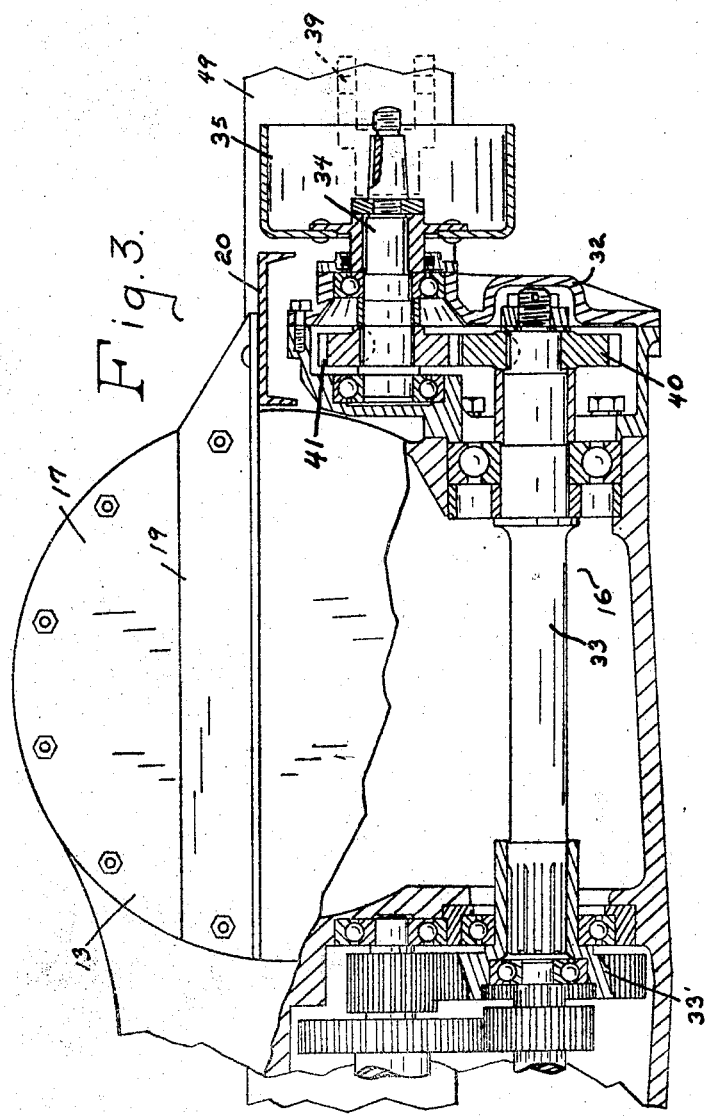

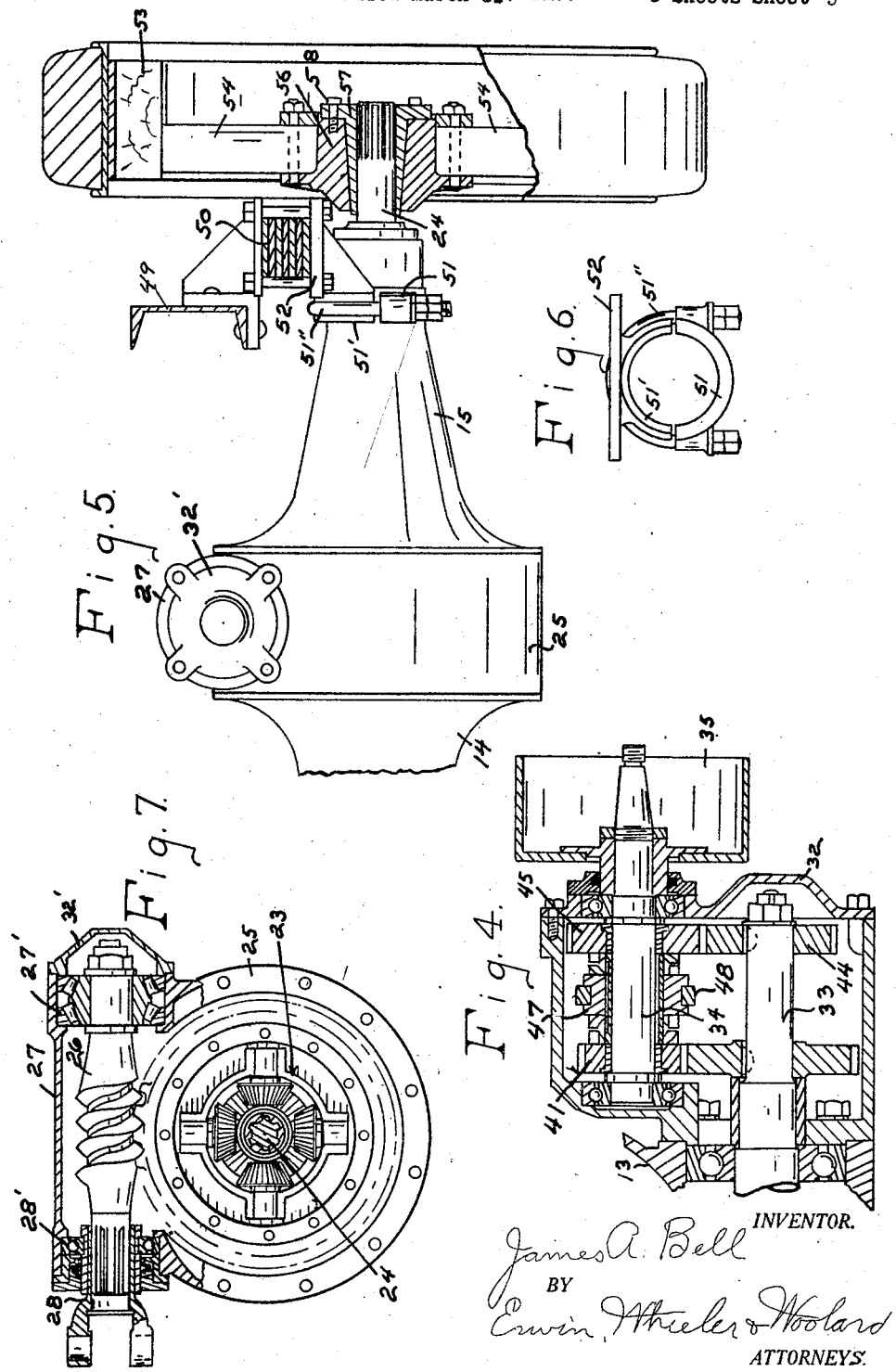

Patented Mar. 16, 1926.

1,576,499

UNITED STATES PATENT OFFICE.

JAMES A. BELL, OF CLINTONVILLE, WISCONSIN.

CONVERTIBLE TRACTOR TRUCK DEVICE.

Application filed March 31, 1924. Serial No. 703,067.

*To all whom it may concern:*

Be it known that I, JAMES A. BELL, a citizen of the United States, residing at Clintonville, county of Waupaca, and State of Wisconsin, have invented new and useful Improvements in Convertible Tractor Truck Devices, of which the following is a specification.

This invention relates to convertible tractor-truck devices and methods of conversion.

It is the primary object of this invention to utilize to an increased degree the parts of a standard tractor for the purposes of a truck made therefrom. Various arrangements for utilizing parts of a Fordson tractor in truck construction have heretofore been devised but the majority of them have contemplated the mounting of Fordson power plant in an ordinary vehicle chassis. It is my purpose to provide a novel arrangement of parts and a set of adapting members whereby many parts of the Fordson which have heretofore been discarded in conversion for trucking purposes may now be utilized.

More specifically stated, it is my purpose to utilize intact the forward and rearward tractor body members, the latter being provided with a novel mounting in the truck frame; to remove the rear axles, axle housings and differential for use in the truck and to provide novel closures for the housing which will be serviceable in the support thereof; to provide a differential gear housing adapted to be fitted to the axle housing members for use in the truck, the worm for driving the differential gear being mounted in the top of the substitute housing instead of in the bottom as in the tractor; to provide a motion reversing connection between the tractor transmission and said worm to correct for the change in position thereof; to provide a novel spring mounting for use in adapting the relatively short tractor axle housings for use in connection with a standard truck frame; and to provide a novel wheel adapted to be used interchangeably with the tractor wheels on the original tractor axles, whereby the truck may be used either for trucking or for tractor purposes without further alterations than the substitution of wheels.

In the drawings:

Figure 1 is a plan view of a complete device embodying this invention but omitting the truck platform or body, which is unessential to this application.

Figure 2 is a side elevation of the device shown in Figure 1.

Figure 3 is a side elevation of the rear end of the tractor unit as it appears when mounted in the truck frame, portions of the wall of said unit being broken away to expose the driving connections, and a rectifying gear set being shown attached to said unit in vertical section.

Figure 4 is a detail view in vertical longitudinal section of a rectifying gear set comprising a modification of that shown in Figure 3.

Figure 5 is a detail view in rear elevation of a portion of the rear axle housing unit with a wheel in assembled relation thereto, portions of the wheel being broken away to a vertical axial section.

Figure 6 is a detail view in side elevation of a special spring seat and clamp which is shown in Figure 5.

Figure 7 is a side elevation of a substitute differential housing drum with a worm casing mounted thereon, appearing in vertical axial section.

Like parts are identified by the same reference characters throughout the several views.

As indicated in the statement of objects, it is the primary purpose of this invention to adapt a particular type of tractor for truck service. The type of tractor referred to is embodied in the well known Fordson and is characterized principally by the fact that it has no frame in the ordinary accepted sense of that term. The engine crank casing 10 and the gear casing 11 are bolted together at 12 to comprise a structural unit which is supported directly from the axles without the intermediation of either a frame or springs. The gear housing 11 is generally of a tubular form and is provided integrally at its rear end with a portion 13 formed to comprise a transverse tube of enlarged diameter, such portion being adapted to serve as a differential gear housing.

The housing portion 13 has a relatively short transverse axial extent and opens laterally of the truck at each of its ends. The margins about each of its end openings are surfaced and are provided with a circumferential series of threaded apertures into which bolts are receivable. Thereby, the rear axle housings 14 and 15 are normally bolted thereto and are arranged to support the tractor body, comprising castings 10 and 11, from the rear axles or wheels.

The present invention contemplates the removal from housing portion 13 of the rear axle housing members 14 and 15 and the use of such members in the truck. The differential gearing of the tractor is also removed from housing 13, and so like-wise is the worm whereby such gearing is driven. In the original tractor the worm is located at 16 beneath the differential gear set which it drives.

It is very desirable to keep the center of gravity of a truck as low as possible. In certain instances where tractors have heretofore been used for truck propulsion the entire tractor body, with its rear axle housings, has been mounted on top of a truck frame, the body being supported from the frame by the axle housings. In such a construction the center of gravity is relatively high, and by removing from the tractor body the axle housing members 14 and 15 I am enabled to effect a very considerable reduction in the height of the vehicle.

I replace housing members 14 and 15 by disk closure plates 17 and 18, which are bolted to the tractor body in the place of the original housing members. To this end they are provided with bolt receiving apertures corresponding to those in the original housing members and are of such a size as to completely close the lateral openings in the portion 13 of the tractor body. By completely closing such openings I exclude dust in a way which would not be possible if the tubular housing members 14 and 15 were used purely as supports for the tractor body from frame 49.

Fastened to each disk 17, 18, by welding or otherwise, and arranged to be attached and held in place with the disk, are rearwardly extending arms 19 which may conveniently comprise angle irons and which project beyond their respective disks sufficiently to engage with a seat member 20 with which the frame is provided. This seat member may take the form of a relatively wide sill or transverse plate comprising a part of the truck frame. It is wider than the ordinary transverse frame members and, therefore, in a sense, is a special seat. However, for the purposes of this description, it may either be considered a part of the frame when attached thereto or may be considered to be a part of the arms 19, which are thereby extended to engage with the side members of the frame. It will be noted that the center of disks 17 and 18 is brought below the upper margin of the side members of the frame, whereas, if the original tubular housing members 14 and 15 were used in place of arms 19 for the support of the tractor body, the center of portion 13 of such body would necessarily be disposed well above the side members of the frame.

In order to utilize housing members 14 and 15, which have been removed from body portion 13, I provide an open ended drum 25 which corresponds in general to the form of housing portion 13 as such portion would appear if it were wholly separated from the remainder of the tractor body. Drum 25 is provided with lateral openings corresponding to those of housing portion 13 and is provided with threaded apertures in the identical locations of the bolt holes in said housing portion. Consequently, the rear axle housing members 14 and 15 may be bolted to the drum 25 to comprise a complete rear axle unit. In this unit the differential gear set 23 and axles 24 are mounted in positions corresponding to the positions originally occupied by them in the tractor.

For the purpose of accommodating the worm 26 which, in the original tractor, is utilized beneath the differential gearing structure for the drive thereof, I form upon drum 25, preferably integrally therewith, a casing 27 with a bearing at 27' corresponding to those in the portion 16 of the tractor body. This bearing is designed to receive the rear end of the original worm 26 from the tractor body and to support it for operative driving engagement with the differential gear set within drum 25. The forward end of the worm is splined, as indicated in Figure 7, and, in the original tractor, has its splined end engaged in the driven member of the transmission gearing of the tractor. To accommodate this worm in my improved apparatus I provide a tubular shaft 28 splined to receive the splined end of worm 26 and projecting from the worm casing 27. A bearing 28' supports the tubular shaft section 28 and the forward end of the worm within casing 27. The forward end of the tubular shaft 28 is connected by a universal joint 29 with the transmission shaft 30.

If casing portion 27 of drum 25, and the worm 26 contained therein, were to be disposed beneath the differential gear set of the truck in the same relative location in which the worm and gear set were incorporated in the original tractor, the result would be to bring casing 27 so close to the road as to leave only about four inches of clearance. It should be explained at this point that the wheels of the truck should be designed to accommodate standard sizes of truck tires, and when so designed, the truck wheels are of considerably less diameter than the wheels of the tractor. Thus, the rear axle of the truck will be considerably lower than the tractor axle, and as a consequence, the clearness between the road surface and the under side of the worm casing is reduced to an impractical degree.

To avoid such a restricted clearance, I have inverted the location of casing 27 on drum 25 to bring the worm casing 27 at the top thereof. Thereby I not only increase to the desired extent the road clearance of the rear axle structure, but, as is clearly indicated in Figure 2, I obtain a substantially straight line drive to worm 26, whereas if the worm were placed in a corresponding position below the rear axle of the truck, the transmission shaft would obviously be inclined at a sharp angle downwardly and a very material loss of power in the universal joints would occur.

Because of the inversion of the worm, however, I am required to operate the transmission shaft 30 in an opposite direction for the forward propulsion of the truck. The worm and the worm gear of the differential gear set have been so designed that when the worm is placed beneath the gear set and is directly coupled with the transmission gearing of the tractor, forward propulsion would result. The mere inversion of the position of the worm, therefore, without other changes, would result in propelling the truck rearwardly when it should go forwardly. Accordingly, I incorporate and provide a set of rectifying gearing whereby the worm is driven in an opposite direction from its direction of drive in the tractor, whereby to compensate for its change of position.

The rectifying gearing to which reference has been made above is incorporated in a special casing 32 bolted to the rear of the tractor body in lieu of the bearing cap through which the worm is removable. This bearing cap may be used, if desired, at 32' to close the rear end of worm casing 27 when the worm has been suitably journaled therein. The worm and worm shaft are replaced by a somewhat longer shaft 33 arranged to couple to the transmission gearing 33' of the tractor in precisely the manner in which the worm was formerly coupled thereto. The original bearing for the worm is utilized for the support of this substitute shaft.

Casing 32, which may also be secured to the transverse member 20 of the truck frame, if desired, is provided with bearings above the substitute shaft section 32, in which bearings a short length of shaft 34 is journaled. The driven shaft 34 projects from casing 32 and preferably carries a transmission shaft brake drum 35 about which is a band 36 arranged to be tightened by a bell crank 37 when it is desired to set the brake. The bell crank may be actuated by a hand or foot lever 38, as desired. Immediately behind drum 35 is a universal joint 39 connecting driven shaft 34 with the transmission shaft 30. The location of the driven shaft is such as to co-operate with the selected position for worm 26, whereby the transmission shaft 30 will lie in substantially a direct line co-axially with each of the shafts connected by it. Thus, the operation of universal joints 29 and 39 is reduced to a minimum.

It is sufficient for the purpose of rectifying the direction of truck drive to provide a single set of gears 40 and 41 on shafts 33 and 34, respectively. Shafts 33 and 34, when connected by gears 40 and 41, will obviously rotate in opposite directions, whereby the direction of rotation of worm 26 will be reversed and the truck will be driven forwardly under normal conditions despite the new position of the worm above the differential gear set driven thereby. I am able conveniently to employ gears 40 and 41 for another purpose, however. The mechanical advantage of the tractor is normally high to give relatively slow speeds and relatively great power despite the large size of the tractor wheels. Therefore, the mere substitution of the ordinary reduced size of truck wheels, other factors remaining the same, would result in a truck which would, for a given engine speed, move more slowly than the tractor and with greater power. Since, for ordinary trucking service, greater rather than less speed is desirable, I prefer to make the driving gear 40 relatively large with respect to the driven gear 41 so that in the normal use of the truck it can be operated at convenient truck speeds. Gears 40 and 41 will, therefore, have a ratio at least high enough to compensate for the change in wheel diameters, and preferably higher, in order that the truck speed may be increased relative to that of the tractor.

As will hereinafter be more fully explained, however, I have arranged for the interchangeable use of the tractor wheels as well as the truck wheels upon the completed vehicle. It is convenient, therefore, to provide for a second speed ratio in the rectifying gear set. To this end the substitute shaft 33 is preferably made of sufficient length to accommodate an additional driving gear 44, and the driven shaft 34 carries an additional driven gear 45. These gears may conveniently be made of like diameter so that their sole function consists in a reversal of the direction of rotation of the transmission shaft while preserving the original mechanical advantage which it is desirable to have when the large size tractor wheels are in use.

Where two sets of driving and driven gearing are employed it is necessary to provide some means for selecting which set shall be operative, and to this end either the driving gears or the driven gears, or both sets of gears, may be mounted loosely upon their respective shafts and arranged to be clutched thereto, as desired. In this particular embodiment of the invention I have illustrated a clutch element 47 mounted on the driven shaft and arranged to engage either of gears 41 or 45 with said shaft. A suitable shifting fork 48 is employed to adjust the clutch element 47 into engagement alternatively with either of the driven gears. Such devices are, however, too well known to require further description, and I wish it to be understood that any appropriate clutch or system of clutches may be used in this connection.

It will be noted that the gearing contained in case 32 is required for the reversal of movement of transmission shaft from the direction of rotation of the substitute shaft 33. Consequently, any desired number of speed changes may be incorporated between these two shafts without the use of a jack shaft. Consequently, in this single set of rectifying gearing I am enabled to correct not only the direction of rotation of the worm for its new position of service, but also to correct the mechanical advantage of the truck whenever it is desired to substitute one set of wheels for the other. At the same time, the transmission mechanism of the tractor is left unimpaired and serviceable without regard to the rectifying gear, although incidentally the rectifying gearing provides an additional reduced speed when the truck wheels are in use and an additional increased speed when the tractor wheels are in use. Furthermore, it will be obvious that by adding additional driving and driven gears in the rectifying set, with additional clutch members to control their use, any required additional changes in speed may be used.

It will be remembered that the original tractor contains no springs and no frame per se. Its axle housing members 14 and 15 are consequently shorter than would be the case if they were called upon for the spring support of a frame 49 of standard width. The axle members 14 and 15 are of substantially the same width as the frame and, consequently, if the springs were interposed directly between the frame and the axle members any ordinary spring seat might be employed. Such an arrangement, however, would greatly increase the height of the truck frame above an elevation which is practicable for trucking purposes. To reduce the height of the frame it is very desirable that the truck springs 50 be located at the side of rather than beneath the longitudinal members of the frame. In the drawings they are so illustrated, being provided with the usual hangers for this purpose.

In order to support springs from the axle with the springs in this position I have been obliged to design a special spring seating attachment for the axle members 14 and 15, such attachment comprising an axle housing engaging clamp, including arcuate members 51 and 51' and a curved bolt 51''. The member 51' is provided with a groove to receive bolt 51'' and is extended laterally and upwardly to provide a spring seat 52 whereby the spring is supported beyond the end of the original castings 14 and 15.

The fact that the live axles 24 and the axle members 14 and 15 are relatively short as compared with similar parts normally used in trucks has led to a further problem in connection with the provision of wheels. The location of the springs makes it essential that the wheels shall not project centrally of the truck from its hub portion, and I have been obliged to design a truck wheel having a peculiar hub receivable upon the original Fordson axle in lieu of the tractor wheel hub, and having its felloe 53 projecting wholly outwardly from its spokes 54. Obviously, a metal wheel might be made to conform to these requirements merely by replacing the spokes 54 by a disk in the usual manner. In such an instance, however, the disk, like the spokes, would be displaced laterally from a central plane through the felloe in order that the felloe may be at a sufficient transverse distance from the springs to avoid contact or interference therewith.

The spokes 54 or, if the wheel be a disk wheel the disk which replaces such spokes will be engaged in a special hub 56 having a tapered bore adapted to receive the standard tapered wedge 57 which is bolted to the hub at 58 and is internally formed for interaction with the splined end of the live axle 24.

It will be seen from the foregoing that I have succeeded in using practically every portion of a Fordson tractor with the exception of the front axle and front wheels, these being removed when the unitary Fordson body and power plant is installed in the truck chassis. It is true that the rear wheels of the Fordson are not used at all times. They are, however, usable, and the design which I have worked out is such that they are usable with the original mechanical advantage if desired so that the entire converted vehicle may serve its original function as a tractor with only such labor as is required to replace the truck wheels with the original rear wheels of the tractor.

At all other times the truck is operable like any other truck to run at normal truck speeds, using standard truck tires, and nevertheless incorporating practically all parts of the original tractor for the functions of corresponding duties in the truck.

I claim:

1. In a device of the character described, the combination with a truck frame and a tractor body from which the rear axle housings have been removed, of closure plates bolted to said body in the place of said housings and provided with arms engaging said frame for the support of said body therefrom.

2. In a device of the character described, the combination with a truck frame and a tractor body including a differential gear casing having an opening, of a plate closing said opening and an arm projecting beyond said plate into operative engagement with said frame.

3. In a device of the character described, the combination with a truck frame and a tractor body including a differential gear casing having lateral openings, of longitudinally extending arms bolted across said openings and engaged with a portion of said frame in operative body supporting relation.

4. In a device of the character described, the combination with a truck frame and a tractor body having a portion formed to comprise a differential gear casing with lateral openings about which the axle housings are boltable to the body, of replacement closures for said openings secured to the body in the place of said housings, and arms adapted to be secured with said closures to said body and projecting therefrom into engagement with said frame.

5. In a device of the character described, the combination with a truck frame and a tractor body having a portion formed to comprise a differential gear casing with lateral openings about which the axle housings are boltable to the body, of replacement closures for said openings secured to the body in the place of said housings, said closures comprising disks having rearwardly projecting arms in engagement with said frame.

6. In a device of the character described, the combination with a truck frame and a tractor body having a portion formed to comprise a differential gear casing with lateral openings about which the axle housings are adapted to be bolted, such housings having been removed, of replacement closures for said openings, means for supporting said body from said frame, and a drum comprising a substitute differential gear casing; axle housings removed from said body and bolted to said drum; and means for supporting said frame from said housings.

7. In a device of the character described, the combination with a truck frame and a tractor body having a portion formed to comprise a differential gear casing with lateral openings about which the axle housings are boltable to the body, such housings having been removed, of replacement closures for said openings secured to the body in the place of said housings and provided with arms engaged with said frame for the support of said body; a substitute drum comprising a differential housing member, axle housings removed from said body and bolted to said drum to comprise a rear axle unit for said truck frame, and spring means supporting said frame from said unit.

8. In a device of the character described, the combination with a driving worm and a driven differential gear set and live axles and laterally projecting axle housings detachably connected with said body, of a truck frame, supporting members for said body engaged with said frame and connected to said body in the place of said housings, a shaft operatively substituted in said body for said worm and projecting from said body, a transmission shaft operatively geared to said last mentioned shaft to rotate in an opposite direction therefrom, a drum and a pair of housing members removed from said body, said drum and housing members being in operative connection to comprise a rear axle housing unit beneath said frame, said drum being formed with bearings and an enclosing casing portion for a worm, a worm removed from said body and mounted in said bearings in operative connection with said transmission shaft, and a differential gear set and axles taken from said body and operatively mounted in said unit to be driven by said worm, said worm being mounted upon an opposite side of said gear set from the normal relative position of the worm and gear set in said body, together with means connecting said unit with said frame.

9. In a device of the character described, the combination with a truck frame and a tractor power plant mounted therein and including a substitute driven shaft projecting rearwardly from said power plant, of a rear axle unit operatively mounted for the support of said frame and including live axles and a differential gear set, a worm journaled in said unit in operative driving relation to said gear set and thereabove, and a transmission shaft connected with said worm and operatively geared with said shaft to rotate in an opposite direction therefrom.

10. A mechanism adapted to be added to a tractor to adapt the tractor for use as a truck, such mechanism comprising a frame operatively wheel-supported at its forward end and provided at its rear with springs and spring seats, means for supporting a tractor body on said frame, a power transmission device comprising a gear set adapted to be bolted to said body, a transmission shaft operatively arranged to be driven through said gear set, a driving gear connected with said shaft, and a differential housing supporting said gear and adapted to receive connection with axle members taken from said body.

11. A mechanism adapted to be used in the construction of a truck with a tractor having a body, a differential housing, a worm shaft journaled in said housing and removable axles and axle housings, said mechanism comprising a frame operatively wheel-supported at its forward end and provided with means for mounting the forward end of the body of such a tractor, springs and spring seats connected with the rear of said frame, replacement closures connected with said frame adapted to be bolted to the differential housing of such a tractor when the axles and axle housings have been disassociated therefrom, means for connecting with said spring seats axle housings removed from such tractor, a second differential housing adapted to be connected to said axle housings to join them operatively, transmission shafting provided with a gear and operatively supported in part by said second housing, a replacement shaft adapted to be substituted for said worm shaft, and means operatively connecting said replacement shaft with said transmission shafting.

12. A mechanism adapted to be used in the construction of a truck with a tractor having a body, a differential housing, a worm shaft journaled in said housing and removable axles and axle housings, said mechanism comprising a frame operatively wheel-supported at its forward end and provided with means for mounting the forward end of the body of such a tractor, springs and spring seats connected with the rear of said frame, replacement closures connected with said frame adapted to be bolted to the differential housing of such a tractor when the axles and axle housings have been disassociated therefrom, means for connecting with said spring seats axle housings removed from such tractor, a second differential housing adapted to be connected to said axle housings to join them operatively, transmission shafting provided with a gear and operatively supported in part by said second housing, a replacement shaft adapted to be substituted for said worm shaft, and means operatively connecting said replacement shaft with said transmission shafting, said means including a gear set adapted to be bolted to the transmission housing of such a tractor and including intermeshing gears connected respectively with said substitute shaft and said transmission shaft, whereby said shafts will rotate in opposite directions.

13. A mechanism adapted to be used in the construction of a truck with a tractor having a body, a differential housing, a worm shaft journaled in said housing and removable axles and axle housings, said mechanism comprising a frame operatively wheel-supported at its forward end and provided with means for mounting the forward end of the body of such a tractor, springs and spring seats connected with the rear of said frame, replacement closures connected with said frame adapted to be bolted to the differential housing of such a tractor when the axles and axle housings have been disassociated therefrom, means for connecting with said spring seats axle housings removed from such tractor, a second differential housing adapted to be connected to said axle housing to join them operatively, transmission shafting provided with a gear and operatively supported in part by said second housing, a replacement shaft adapted to be substituted for said worm shaft, and means operatively connecting said replacement shaft with said transmission shafting, said means including a gear set adapted to be bolted to the transmission housing of such a tractor and including intermeshing gears connected respectively with said substitute shaft and said transmission shaft, whereby said shafts will rotate in opposite directions, said transmission shafting being so associated with said second differential housing as to be adapted to drive axle shafts associated therewith in an opposite direction from that in which said worm shaft is adapted to drive axle shafts associated with the differential housing of said tractor.

14. The combination with a standard frame of a rear axle unit comprising a pair of tractor axle housing members and a substitute differential casing connecting said members, a spring seat clamped to each of said members and providing laterally offset spring supporting portions, live axles operatively mounted in said members and projecting therebeyond, and wheels mounted on said axles and including laterally offset hubs and felloe portions, the felloe portions being extended outwardly off center with reference to the hub portions, whereby to afford clearance for a spring supported on said laterally offset seat.

15. In a device of the character described, the combination with a truck frame, of a tractor body supported therefrom and including a differential housing portion having worm gear bearings therebeneath, a replacement shaft journaled in said bearings and projecting beyond said portion, a driven shaft intergeared with said replacement shaft for rotation in an opposite direction, a substitute differential housing spaced rearwardly of said frame from said body, tractor differential gearing mounted in said housing, a tractor worm journaled in said housing above said gearing and in mesh therewith, and a transmission shaft coupled to said driven shaft and to said worm, the opposite rotation of said driven shaft, transmission shaft and worm being adapted to rectify the rotation of said differential gearing in view of the location of said worm above rather than below said differential gearing.

16. In a device of the character described, the combination with a truck frame and a tractor body supported therefrom and provided with a differential casing portion and with journals for a driving worm therebeneath, of a replacement shaft journaled in said bearings and of a length to project beyond said body, a driven shaft journaled above said replacement shaft, a substitute differential casing spaced rearwardly along said frame from said body and provided in an upper portion with bearings, a tractor differential set in said casing, live axles projecting upon either side thereof, tractor axle housing members upon said axles, wheels of various diameter interchangeably mountable upon said shafts, a tractor worm journaled in said bearings in driving relation to said differential gear set and operatively connected with said driven shaft, and gears mounted respectively on said driven shaft and on said replacement shaft and in operative mesh, whereby said shafts rotate in opposite directions, said gears being adapted to rectify the direction of rotation of said live axles in view of the location of the worm above said differential gear set rather than therebeneath, said gears having a ratio in the same relation to a one to one ratio that the diameter of the larger wheels mountable on said axles bears to the ratio of the smaller wheels mountable thereon.

17. A vehicle comprising a vehicle frame, a power plant at the forward end thereof, a set of differential gearing, and a plurality of differential gear housings each adapted interchangeably to receive said set of differential gearing and to provide bearings for transmitting motion thereto from said power plant.

18. A vehicle comprising a vehicle frame, a power plant at the forward end thereof, a set of differential gearing, and a plurality of differential gear housings each adapted interchangeably to receive said set of differential gearing and to provide bearings for transmitting motion thereto from said power plant, said housings being at different longitudinal distances from said power plant and both of said housings being essential to said vehicle when said differential gearing is mounted in said rearmost housing.

19. A vehicle comprising a vehicle frame, a power plant at the forward end thereof, a set of differential gearing, and a plurality of differential gear housings each adapted interchangeably to receive said set of differential gearing and to provide bearings for transmitting motion thereto from said power plant, together with spring means for the connection of one of said differential housings with said frame for the support of said frame, and rigid arms for the connection of the other of said differential housings with said frame for its support from said frame.

20. A vehicle comprising a vehicle frame, a power plant at the forward end thereof, a set of differential gearing, and a plurality of differential gear housings each adapted interchangeably to receive said set of differential gearing and to provide bearings for transmitting motion thereto from said power plant, together with spring means for the connection of one of said differential housings with said frame for the support of said frame, and rigid arms for the connection of the other of said differential housings with said frame for its support from said frame, said last mentioned housing being rigidly connected with said power plant and being serviceable for the support thereof from said frame when said differential set is mounted in the other of said housings.

JAMES A. BELL.